(No Model.)   6 Sheets—Sheet 3.
W. H. HULSE & J. V. HULSE, Jr.
TYPE WRITING MACHINE.
No. 548,611.   Patented Oct. 22, 1895.
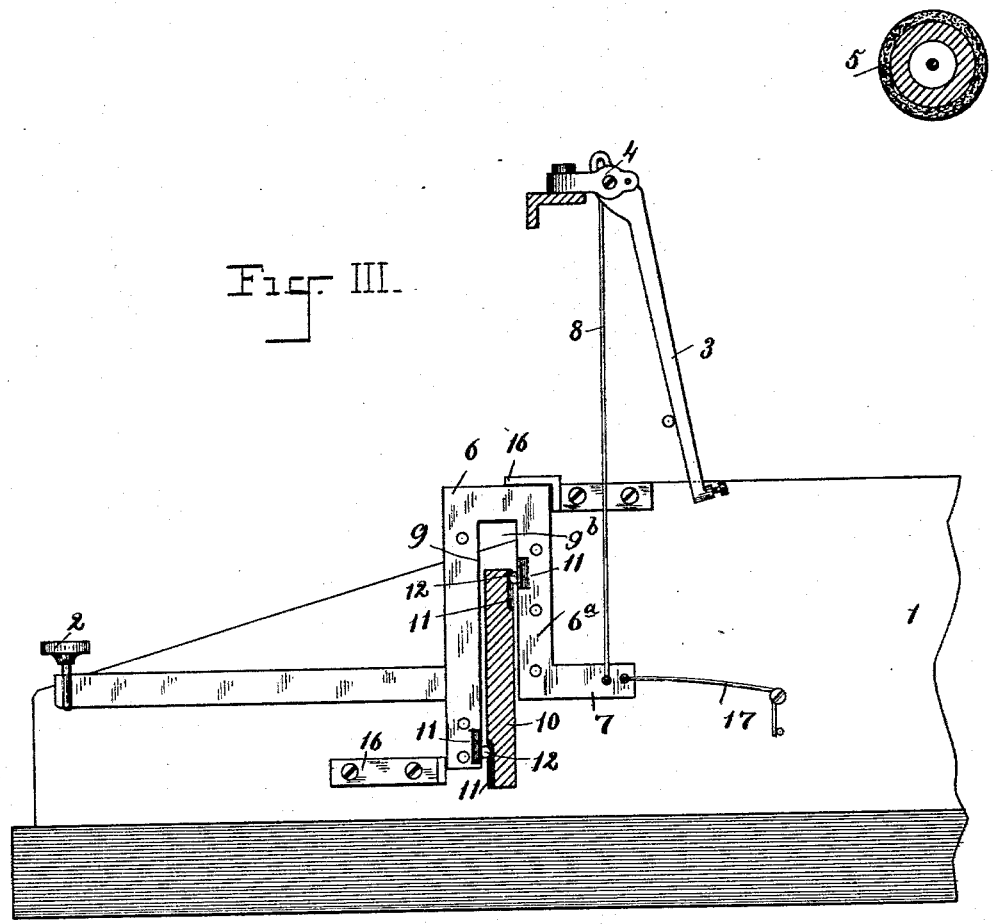
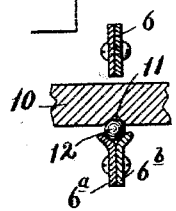
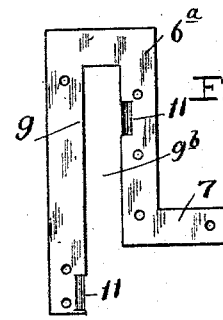
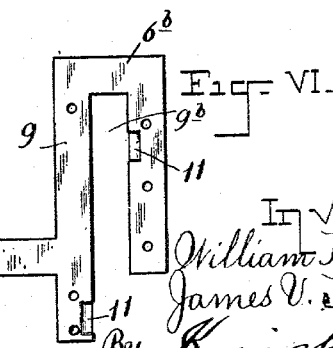
Witnesses
Lillie Hanna
William K. Morrison
Inventors
William H. Hulse
James V. Hulse, Jr.
By Knight Bros.
Attorneys (No Model.)  6 Sheets—Sheet 4.
W. H. HULSE & J. V. HULSE, Jr.
TYPE WRITING MACHINE.
No. 548,611. Patented Oct. 22, 1895.
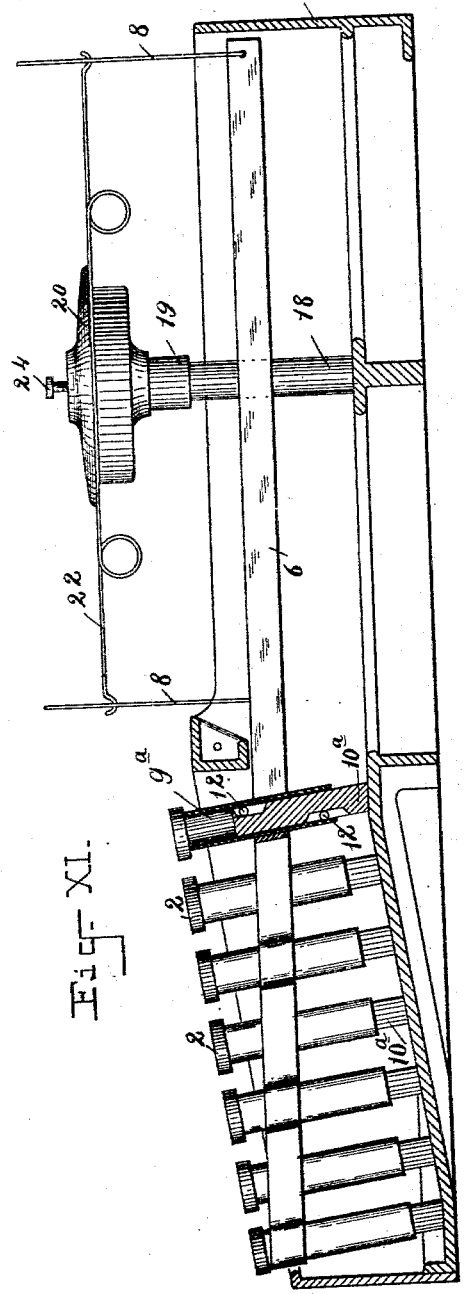
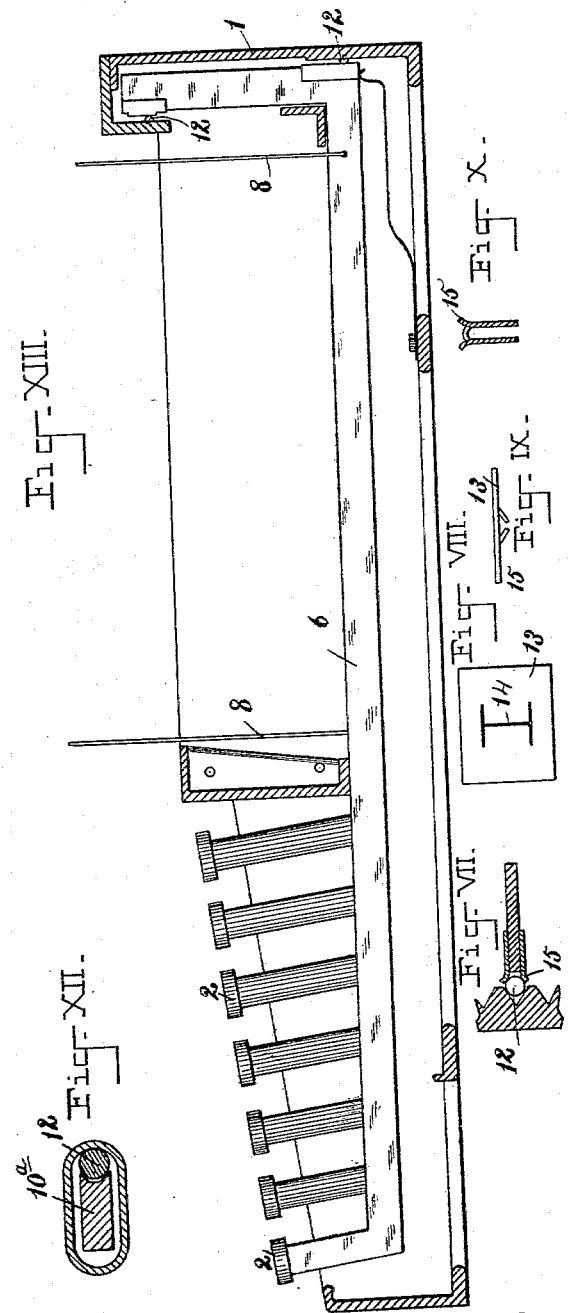
Witnesses
Lillie Hanna
William K. Morrison
Inventors
William H. Hulse
James V. Hulse, Jr.
By Knight Bros
Attorneys

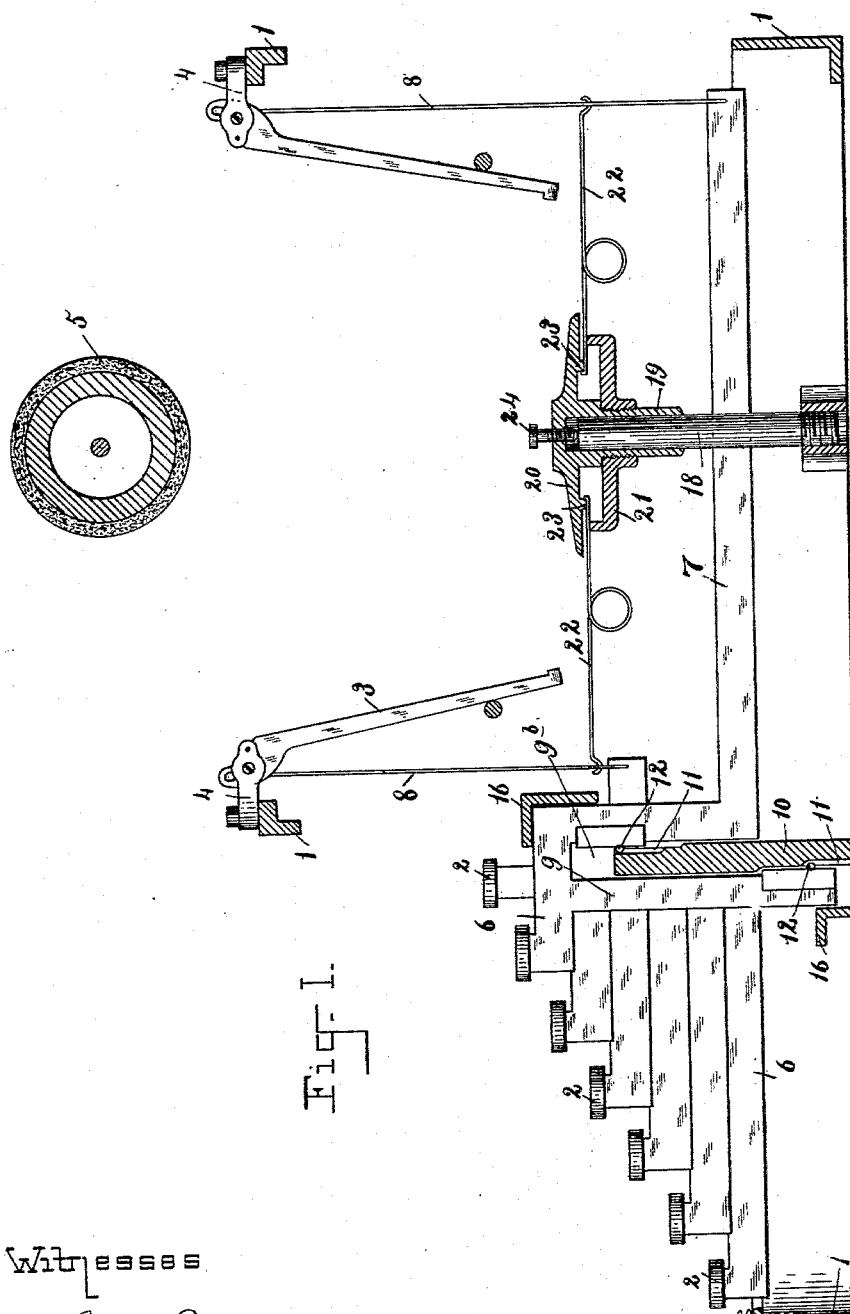

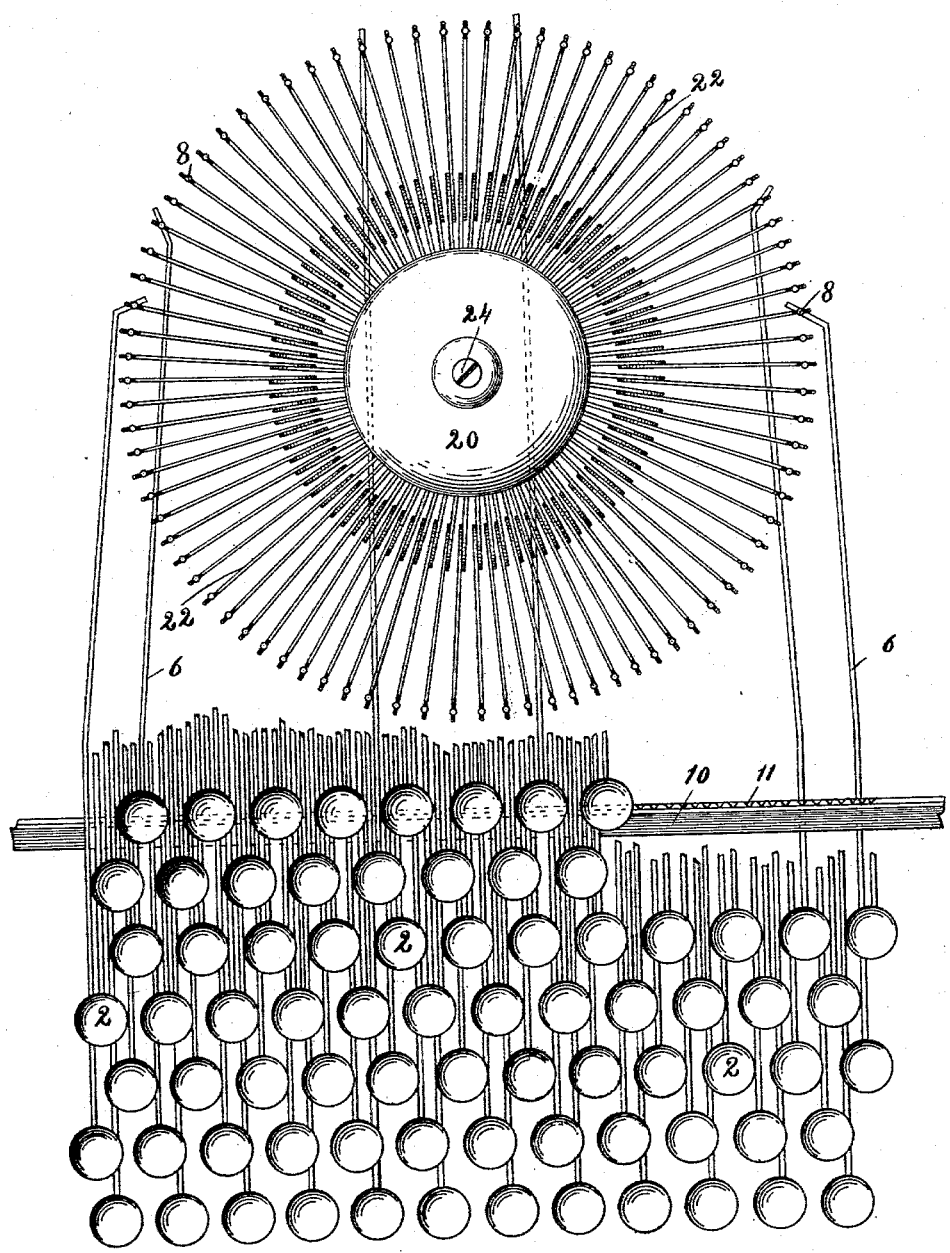

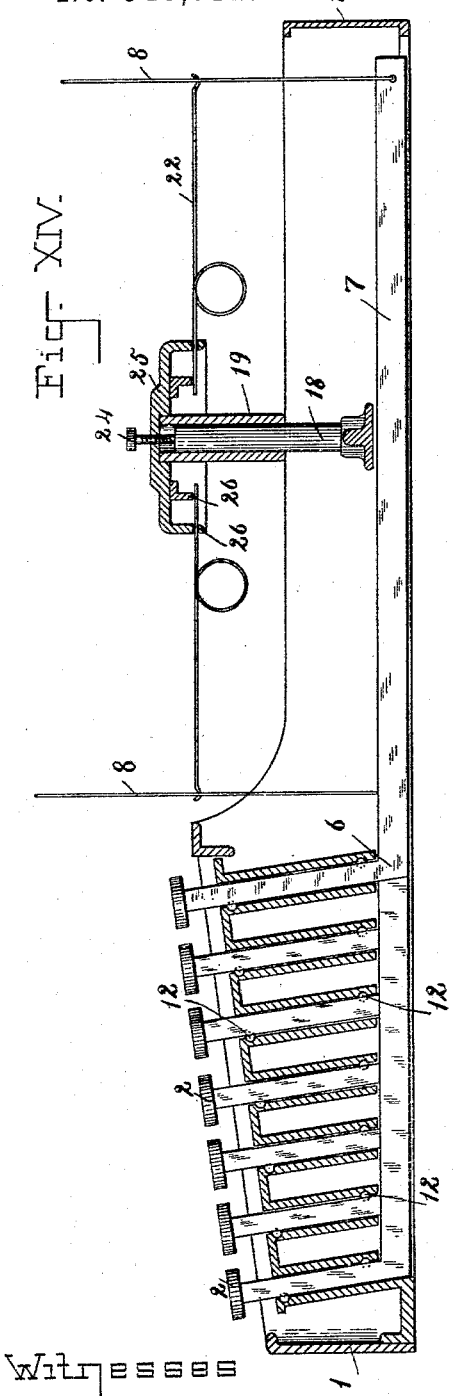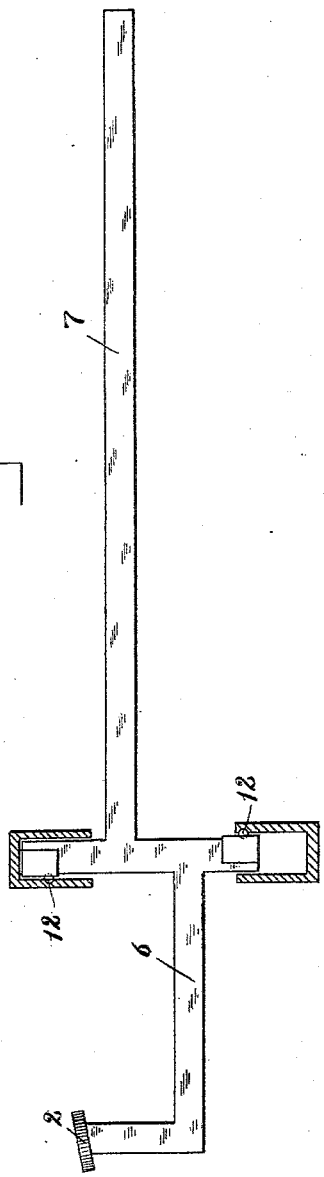

(No Model.)  6 Sheets—Sheet 6.
W. H. HULSE & J. V. HULSE, Jr.
TYPE WRITING MACHINE.
No. 548,611.  Patented Oct. 22, 1895.
Fig. XVI.
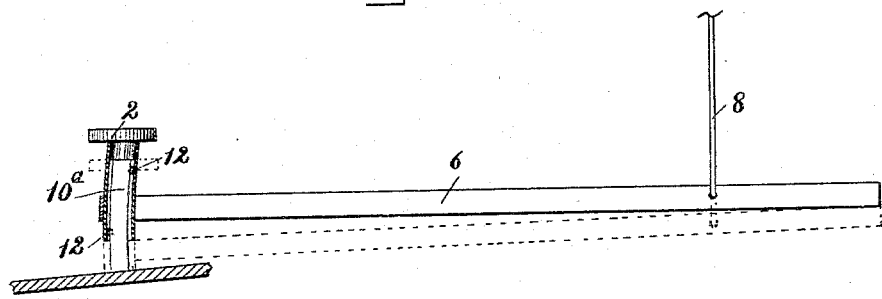
Fig. XVII.
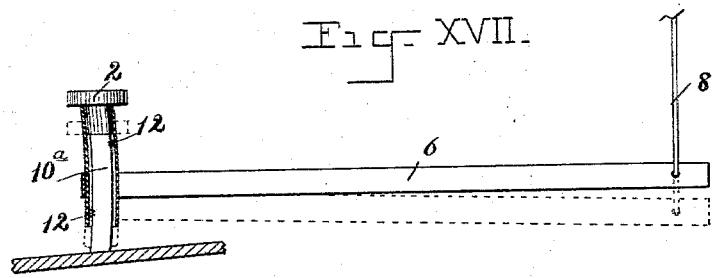
Witnesses
Lillie Hanna
William K. Morrison
Inventors
William H. Hulse
James V. Hulse, Jr.
By Knight Bros.
Attys.

UNITED STATES PATENT OFFICE.

WILLIAM H. HULSE AND JAMES V. HULSE, JR., OF BROOKLYN, NEW YORK; SAID JAMES V. HULSE, JR., ASSIGNOR TO SAID WILLIAM H. HULSE.

TYPE-WRITING MACHINE.

SPECIFICATION forming part of Letters Patent No. 548,611, dated October 22, 1895.

Application filed January 26, 1893. Renewed April 4, 1895. Serial No. 544,486. (No model.)

*To all whom it may concern:*

Be it known that we, WILLIAM H. HULSE and JAMES V. HULSE, Jr., citizens of the United States, residing in the city of Brooklyn, county of Kings, and State of New York, have invented certain new and useful Improvements in Type-Writing Machines, of which the following is a specification.

Our invention is designed at once to improve the action and simplify and cheapen the construction of type-writing machines. To these ends we employ in place of the ordinary pivoted key-lever a key-bar which has a parallel movement in a vertical plane, guided with little friction by balls arranged in V-grooves. We also arrange the type-bar return-springs in a group radiating from a common center and adapted to be simultaneously tightened or loosened.

In the accompanying drawings, Figure I is a partial vertical sectional view of a type-writing machine embodying our invention. Fig. II is a partial plan view thereof. Fig. III is a partial sectional view illustrating a modification. Figs. IV, V, and VI are detail views illustrating the construction of the key-bar shown in Fig. III. Figs. VII, VIII, IX, and X are detail views illustrating the method of making the ball-grooves. Fig. XI is a sectional elevation illustrating other modifications. Fig. XII is a transverse sectional view to a larger scale on the line XII XII, Fig. XI. Figs. XIII and XIV are sectional elevations illustrating further modifications. Figs. XV, XVI, and XVII are detail views illustrating other modified forms of our invention.

Referring to Figs. I, II, and VII to X, 1 may represent the frame, 2 the keys, 3 the type-bars, 4 the type-bar pivots, and 5 a rotary platen or paper cylinder of a type-writing machine. These parts may all have customary or other preferred construction and arrangement. The keys 2 are carried at the front ends of bars 6, which are rigid flat plates, preferably metallic, arranged in parallel vertical planes, having rear extensions 7 connected by rods 8 with the butts of type-bars 3. The key-bars 6 have, at distances from the front ends varying with the bank to which the key belongs, yokes 9, which have slots $9^b$ opening downward and engaging over a vertical bridge 10, placed transverse of the machine. On its rear side, at top, and on its front side, at bottom, the bridge 10 has vertical V-grooves 11, which serve as guides for metal balls 12. The bars 6 have also on opposite sides of slots $9^b$, in position to correspond with the grooves on the bridge, similar grooves 11, which may be formed as shown in Figs. VII to X.

13, Fig. VIII, is a flat metal blank in which is stamped an I-shaped slot 14, where edges are bent down, as shown in Fig. IX. The blank is then bent to the U form shown in Fig. X and fastened, as shown in Fig. VII, to the edge of the slot $9^b$, so that the outturned edges 15 of the slot 14 will form a guide for the antifriction-balls. Cross-bars 16, Fig. I, on the frame serve as guides and stops for the key-bars. The stroke of the keys in this construction is remarkably free and even, the key has little side motion, the wear is almost nothing, and the manufacture is simple and cheap.

Figs. III to VI illustrate a slightly different and in some respects superior construction. In this the preferred form of our invention the yoke surrounding the bridge is made additionally stiff and stronger than the rest of the key-bar by being formed of two plates $6^a$, Fig. V, and $6^b$, Fig. VI, which are riveted together to form the complete bar shown in Fig. III, and of which one $6^b$ carries the key, while the other has the rearwardly-projecting tongue 7, for attachment of the type-bar rod 8. Portions of the edges of the slots $9^b$ in the plates $6^a$ $6^b$ are turned, as shown, so that when the two plates are riveted together proper guides 11 are provided without the necessity of adding the separate pieces used in the form of the invention illustrated in Fig. I.

The remaining figures illustrate various other ways in which we can arrange a key-bar to be guided in a vertical plane by vertical grooves and balls.

In Figs. XI and XII, instead of showing a single bridge 10 running across the machine, we show each key-bar having, as it were, a separate and individual bridge in the form of a grooved stud $10^a$. In this form it is best to have the complete inclosing-socket $9^a$ take the place of the yoke with its open slot $9^b$.

In Fig. XIII the construction is similar, the place of guiding being merely moved to the rear of the machine-frame.

In Figs. XIV and XV two separate and readily-understood methods are shown of mounting the bars, so that the guide-sockets are on the machine-frame instead of on the key-bars.

Figs. XVI and XVII show constructions similar to Fig. XI, except that the guide-stud $10^a$ is bent in near the other direction to give a diminished or an inclined motion at the inner end of the bar.

For returning the type-bars we may employ separately-mounted springs 17, connected to each key-bar, as shown in Fig. III; but we prefer to employ an arrangement such as illustrated in Figs. I, II, XI, and XIV. In Fig. I we show a central stud 18 immediately under the type-striking point, on which stud is arranged to slide the thimble 19 of a clamping-disk 20. A second clamping-disk 21 is screwed upon the thimble 19, and the springs 22 of the several type-bars are arranged radially, as shown in Fig. II, around between the two disks held in by upturned toes catching over an annular shoulder 23 on disk 20. The outer ends of the springs 22 engage in any desired manner with rods 8 and tend to press the latter upward. A set-screw 24, passing through the upper disk 20 and impinging on the top of stud 18, serves to raise or lower the springs all together and thus to simultaneously alter their pressure on the rods 8. It is understood that the thimble 19 will clasp the stud 18 with sufficient friction to prevent its free movement.

Fig. XIV shows merely a modification of the spring-support by the substitution for the two clamping-disks of a single disk 25, having two downturned flanges 26, of which the outer has numerous perforations to receive the inner ends of springs 22.

Having thus described our invention, the following is what we claim as new therein and desire to secure by Letters Patent:

1. In a typewriting machine, the combination with the stationary frame and suitable type-bars, key-bars connected to said type-bars, said key-bars and frame having guiding grooves and anti-friction balls, substantially as set forth.

2. In a typewriting machine, in combination with the stationary frame and suitable type-bars, a flat key-bar connected to said type-bars, having no fixed fulcrum, arranged to move in a vertical plane, a bridge, forming part of the stationary frame, said bridge and key-bar having corresponding vertical guiding grooves and suitable anti-friction balls in said grooves, substantially as set forth.

3. The combination of the stationary frame, the rigid bridge forming part thereof and having vertical guiding grooves, the key-bar having a slotted or socketed yoke engaging said bridge and correspondingly grooved and anti-friction balls arranged to operate, substantially as set forth.

4. The two-part key-bar composed of two flat plates $6^a$, $6^b$, fixed together, having a slotted yoke grooved, substantially as set forth.

5. In a typewriting machine, the combination with a series of type-bars, and the connecting rods depending vertically therefrom; of a series of radially arranged return springs connected directly with the rods, and circular clamping devices which hold the springs from a common point having suitable means of adjustment, substantially as described.

6. In a typewriting machine in combination with the type-bars, the series of individual return springs therefor and the clamp for holding and adjusting the said individual springs all together consisting of the disk 21 having the upturned edge, the disk 22 having the shoulder 23 and the adjusting screw 24 all arranged and adapted to operate substantially as set forth.

7. The combination with the type-bars 3, rods 8, individual return springs 22, the supporting post 18, the disk 21, the disk 20 having shoulder 23, the said springs having upturned inner ends adapted to engage said shoulder, substantially as set forth.

WM. H. HULSE.
JAS. V. HULSE, JR.

Witnesses:
L. WOOLSEY,
M. V. BIDGOOD.